(12) United States Patent
Zhu

(10) Patent No.: US 12,307,882 B2
(45) Date of Patent: May 20, 2025

(54) ENHANCED VIBRATION PROMPTING METHOD AND ELECTRONIC DEVICE

(71) Applicant: Honor Device Co., Ltd., Shenzhen (CN)

(72) Inventor: Jianwei Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/253,271

(22) PCT Filed: Dec. 21, 2022

(86) PCT No.: PCT/CN2022/140540
§ 371 (c)(1),
(2) Date: May 17, 2023

(87) PCT Pub. No.: WO2023/130956
PCT Pub. Date: Jul. 13, 2023

(65) Prior Publication Data
US 2024/0371239 A1    Nov. 7, 2024

(30) Foreign Application Priority Data

Jan. 10, 2022  (CN) .......................... 202210022946.2
Jan. 18, 2022  (CN) .......................... 202210055372.9

(51) Int. Cl.
*G08B 6/00*        (2006.01)
(52) U.S. Cl.
CPC ..................................... *G08B 6/00* (2013.01)

(58) Field of Classification Search
CPC ....................................................... G08B 6/00
See application file for complete search history.

(56) References Cited

U.S. PATENT DOCUMENTS

| 7,136,482 | B2 | 11/2006 | Wille |
| 10,992,821 | B2 | 4/2021 | Zhang |
| 12,057,009 | B2 * | 8/2024 | Zhu ....................... H02P 25/034 |
| 12,136,896 | B2 * | 11/2024 | Zhu ........................ G06F 3/016 |

(Continued)

FOREIGN PATENT DOCUMENTS

| CN | 1372429 A | * 10/2002 | ............... H04B 1/40 |
| CN | 101048945 A | 10/2007 | |

(Continued)

*Primary Examiner* — Chico A Foxx
(74) *Attorney, Agent, or Firm* — Conley Rose, P.C.

(57) ABSTRACT

An enhanced vibration prompting method applicable to an electronic device includes detecting a first event, where music corresponding to the first event includes sub-segments; and vibrating at first/second intensities for first/second time periods, respectively. Both the first intensity and the second intensity may be greater than or equal to a third intensity that corresponds to a strongest music intensity in a first sub-segment and a second sub-segment. A length of the first time period may be greater than a duration of the first sub-segment when the duration of the first sub-segment is less than or equal to a first value. An interval between the first time period and the second time period may be less than a time interval between the first sub-segment and the second sub-segment when the time interval between the first sub-segment and the second sub-segment is greater than or equal to a second value.

20 Claims, 10 Drawing Sheets

(56) References Cited

U.S. PATENT DOCUMENTS

| | | | |
|---|---|---|---|
| 2002/0061772 A1* | 5/2002 | Hayashi | H04M 19/041 |
| | | | 455/566 |
| 2003/0067440 A1* | 4/2003 | Rank | G06F 3/016 |
| | | | 345/156 |
| 2006/0011042 A1 | 1/2006 | Brenner et al. | |
| 2010/0148942 A1 | 6/2010 | Oh et al. | |
| 2020/0053227 A1 | 2/2020 | Zhang | |
| 2020/0230647 A1* | 7/2020 | Shim | H04M 19/047 |
| 2021/0294418 A1 | 9/2021 | Takeda et al. | |
| 2023/0033892 A1* | 2/2023 | Nakagawa | G06F 3/04847 |
| 2023/0038998 A1* | 2/2023 | Yokoyama | G06F 3/016 |
| 2024/0334126 A1* | 10/2024 | Ye | G08B 6/00 |

FOREIGN PATENT DOCUMENTS

| | | |
|---|---|---|
| CN | 102024481 A | 4/2011 |
| CN | 106155314 A | 11/2016 |
| CN | 108777747 A | 11/2018 |
| CN | 111182140 A | 5/2020 |
| CN | 112162721 A | 1/2021 |
| CN | 112269895 A | 1/2021 |
| CN | 112637422 A | 4/2021 |
| CN | 109493879 B | 12/2021 |
| WO | WO-9917850 A2 * | 4/1999 ............ A63F 13/02 |
| WO | 2015188581 A1 | 12/2015 |

* cited by examiner

ENHANCED VIBRATION PROMPTING METHOD AND ELECTRONIC DEVICE

CROSS-REFERENCE TO RELATED APPLICATIONS

This application is a U.S. National Stage of International Application No. PCT/CN2022/140540 filed on Dec. 21, 2022, which claims priority to Chinese Patent Application No. 202210022946.2, filed with the China National Intellectual Property Administration on Jan. 10, 2022, and Chinese Patent Application No. 202210055372.9, filed with the China National Intellectual Property Administration on Jan. 18, 2022, all of which are incorporated herein by reference in their entireties.

TECHNICAL FIELD

This application relates to the field of terminals, and in particular, to an enhanced vibration prompting method and an electronic device.

BACKGROUND

An electronic device may output prompt information in a case of, for example, an incoming call, receiving of a new message, and alarm clock ringing. The prompt information includes: a music prompt, a vibration prompt, and the like. The vibration prompt may be specifically vibrating with a music rhythm. However, due to instability of the music rhythm, the vibration is sometimes strong and sometimes weak, and sometimes there is no vibration for a period of time, which easily causes a user to not feel vibration prompt information.

SUMMARY

This application provides an enhanced vibration prompting method and an electronic device, and the method is applicable to the electronic device. The method may implement that when the electronic device detects an event, enhanced vibration information is outputted based on a feature of music corresponding to the event, so that a user may still feel an enhanced vibration effect when a music prompt is off and only the enhanced vibration prompt is enabled, or when a music prompt cannot be heard in a noisy environment, which prevents the user from ignoring a corresponding event.

According to a first aspect, this application provides an enhanced vibration prompting method, and the method is applicable to an electronic device. The method includes: detecting, by the electronic device, a first event, where music corresponding to the first event includes: a first sub-segment and a second sub-segment; and vibrating, by the electronic device, at a first intensity within a first time, and vibrating at a second intensity within a second time, where the first time, the first intensity, the second time, and the second intensity conform to any one or more of the following: both the first intensity and the second intensity are greater than or equal to a third intensity, and the third intensity corresponds to the strongest music intensity in the first sub-segment and the second sub-segment; when duration of the first sub-segment is less than or equal to a first value, a length of the first time is greater than the duration; or when a time interval between the first sub-segment and the second sub-segment is greater than or equal to a second value, an interval between the first time and the second time is less than the time interval.

After adopting the method provided in the first aspect, in a case that there is no ringing music playing, that is, when the user only enables the enhanced vibration prompt, and if the electronic device 100 is placed in a pocket, a table, or a backpack, although the music sense is weak in some periods of time in the ringing music, a vibration effect corresponding to a part with weak music sense is enhanced by increasing the vibration intensity, prolonging a time of a short vibration or compressing the vibration interval. Thereby preventing the user from missing a call, or missing a message, a notification, an alarm clock, a memo event, or the like, and improve user experience.

With reference to the method provided in the first aspect, before the detecting, by the electronic device, a first event, the method further includes: obtaining, by the electronic device, standard random vibration information based on the music, where the standard random vibration information includes: a third time, a fourth intensity corresponding to the third time, a fourth time, and a fifth intensity corresponding to the fourth time; the third time is equal to the duration of the first sub-segment, and the fourth time is equal to duration of the second sub-segment; the fourth intensity corresponds to a sound intensity within the first sub-segment, and the fifth intensity corresponds to a sound intensity within the second sub-segment; and the third intensity is greater than or equal to the fourth intensity and the fifth intensity.

In this way, the electronic device may perform enhanced vibration effect based on the standard vibration information, which not only retains a relationship between the vibration effect and the feature of the music, but also enhances tactile experience of vibration to a certain extent, and not only improves the interest of vibration prompt, but also enhances experience of vibration prompt.

With reference to the method provided in the first aspect, the first event includes: an incoming call, a message, a notification, an alarm clock, a memo event, game start, or video playing.

In this way, the electronic device may output enhanced vibration prompt information in various scenarios, to improve user experience.

With reference to the method provided in the first aspect, the music corresponding to the first event is set by a user or set by default by the electronic device.

In this way, an interaction between the user and the electronic device is increased, and a personalized setting option is improved, so that the user may select personal favorite music to experience an enhanced vibration effect corresponding to the music.

With reference to the method provided in the first aspect, the music corresponding to the first event is pre-stored in the electronic device, or obtained from another device by the electronic device.

In this way, the user may set the music corresponding to the enhanced vibration in various manners, to improve the user experience.

With reference to the method provided in the first aspect, before the vibrating, by the electronic device, at a first intensity within a first time, and vibrating at a second intensity within a second time, the method further includes: enabling, by the electronic device, an enhanced vibration function, where the enhanced vibration function is used for the electronic device to vibrate at the first intensity within the first time and vibrate at the second intensity within the second time.

In this way, the enhanced vibration function may be selected whether to be applied to the electronic device according to a user preference.

With reference to the method provided in the first aspect, before the enabling, by the electronic device, an enhanced vibration function, the method further includes: receiving, by the electronic device, a first operation, where the first operation is used for triggering the electronic device to enable the enhanced vibration function.

With reference to the method provided in the first aspect, the first operation is specifically: acting on an enhanced vibration function option provided by a setting application; acting on an enhanced vibration function option provided by a pull-down notification bar; or a voice instruction inputted by a user.

In this way, the user may enable the enhanced vibration function through various operation manners, to improve practicability of the solution.

With reference to the method provided in the first aspect, before the vibrating, by the electronic device, at a first intensity within a first time, and vibrating at a second intensity within a second time, the method further includes: receiving, by the electronic device, a second operation, where the second operation is used for setting an enhancement level; when the enhancement level is higher, the first time, the first intensity, the second time, and the second intensity conform to any one or more of the following: the third intensity is greater; the length of the first time is longer; or the time interval is shorter.

In this way, the user may set the level of enhanced vibration according to personal preferences, to satisfy personalized requirements of the user.

With reference to the method provided in the first aspect, the duration of the first sub-segment and the duration of the second sub-segment are obtained by the user or obtained by the electronic device through an algorithm.

In this way, the electronic device may obtain a feature of the music in various manners, to improve the practicability of the solution.

With reference to the method provided in the first aspect, the first sub-segment and the second sub-segment each include one or more of the following: melody, rhythm, or beat of the music.

In this way, the enhanced vibration effect may be associated with the melody, rhythm or beat of the music, to improve interest of a vibration prompt.

With reference to the method provided in the first aspect, the first intensity is the same as the second intensity.

In this way, an enhanced vibration intensity may be a fixed value, to reduce workload of the electronic device.

With reference to the method provided in the first aspect, the electronic device includes a linear motor, and the vibrating, by the electronic device, at a first intensity within a first time, and vibrating at a second intensity within a second time specifically includes: driving, by the electronic device, the linear motor to vibrate at the first intensity within the first time, and vibrate at the second intensity within the second time.

In this way, the electronic device adopts a linear motor with excellent vibration performance, which can output a better enhanced vibration effect.

With reference to the method provided in the first aspect, during the vibrating, by the electronic device, at a first intensity within a first time, and vibrating at a second intensity within a second time, the method further includes: playing, by the electronic device, the music.

In this way, when the electronic device detects an event, the electronic device not only plays music, but also outputs enhanced vibration prompt information corresponding to the music, thereby bringing the user a double experience of hearing and touch, and bringing a more comprehensive prompt effect.

According to a second aspect, this application provides a chip, used in an electronic device, where the chip includes one or more processors, and the processor is configured to invoke computer instructions to cause the electronic device to perform the method according to any one of the first aspect.

According to a third aspect, this application provides a computer-readable storage medium, storing instructions, where the instructions, when run on an electronic device, cause the electronic device to perform the method according to any one of the first aspect.

According to a fourth aspect, this application provides an electronic device, including one or more processors and one or more memories, where the one or more memories are coupled to the one or more processors, the one or more memories are configured to store computer program code, the computer program code includes computer instructions, and the computer instructions, when executed by the one or more processors, cause the electronic device to perform the method according to any one of the first aspect.

DESCRIPTION OF EMBODIMENTS

Figure 1:
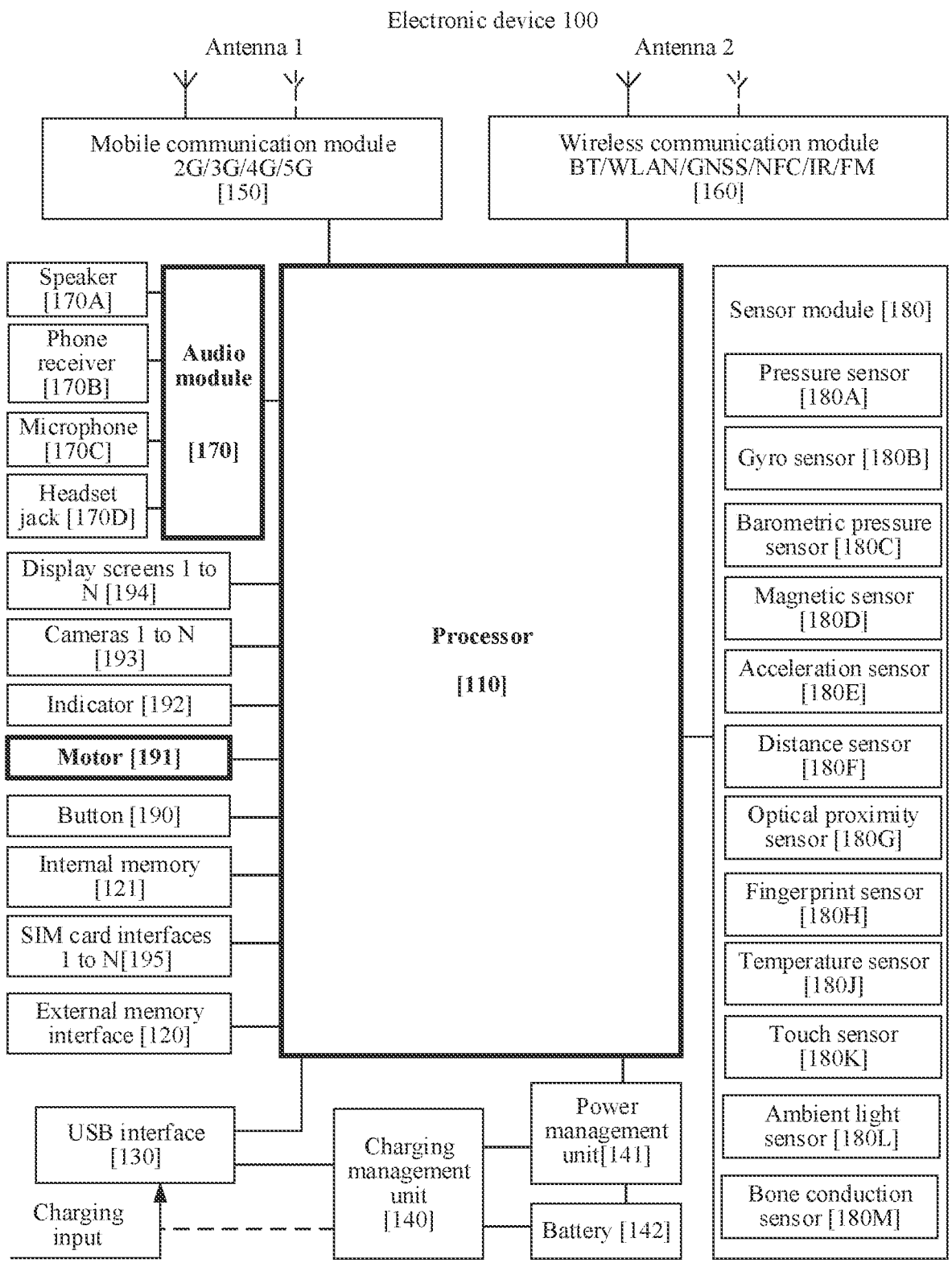
FIG. 1 is a schematic diagram of a hardware architecture of an electronic device 100 according to an embodiment of this application.

The following clearly and thoroughly describes technical solutions in embodiments of this application with reference to the accompanying drawings. In the descriptions of the embodiments of this application, "/" means "or" unless otherwise specified. For example, A/B may represent A or B. The term "and/or" describes only an association relationship for describing associated objects and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of the quantity of indicated technical features. Therefore, a feature defined to be "first" or "second" may explicitly or implicitly include one or more features. In the description of the embodiments of this application, unless otherwise stated, "A plurality of" refers to two or more.

"Embodiment" mentioned in this specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in this application may be combined with other embodiments.

A term "user interface (user interface, UI)" in the following embodiments of this application is a medium interface for interaction and information exchange between an application or operating system and a user, and implements the conversion between an internal form of information and a form of the information acceptable to the user. The user interface is source code written in a specific computer language such as java and an extensible markup language (extensible markup language, XML). An interface source code is parsed and rendered on a terminal device, and is finally presented as content that can be recognized by the user. A graphic user interface (Graphic user interface, GUI) is a common form of the user interface, which is a graphical display of a user interface related to computer operations. The graphic user interface may be a text, an icon, a button, a menu, a tab, a text box, a dialog box, a status bar, a navigation bar, a Widget, and other visual interface elements displayed in the display screen of the electronic device.

Firstly, related concepts of music involved in this application are introduced, including melody, rhythm, beat, and the like. The concepts are strictly defined in music score theory as follows:

Melody is a primary element of the music, which specifically refers to a melody formed by movement and rhythm of notes with different pitches (a level of a sound) and different time values (a length of a sound) in a beat through a rhythm.

Rhythm refers to an organizational form composed of the length and intensity of sounds. Specifically, in a music score, a length of a note may be identified by notes with different time values, for example, a whole note, a half note, a quarter note, and an eighth note; there is a strong beat and a weak beat in the music, and the strong beat and the weak beat are generally defined by a time signature of the beat, for example, two fourth notes, three fourth notes, three eighth notes, four fourth notes, six eighth notes, and the like.

Beat refers to that the strong beat and the weak beat are repeated, periodically, and regularly to form a beat. Beat specifically refers to a total length of notes in each measure in a music score. For example, a piece of music is four fourth notes, that is, four notes are taken as one beat, and four beats per measure. An alternation rule of beat strength is that a first beat is strong, a second beat is weak, a third beat is sub-strong, and a fourth beat is weak, that is, strong-weak-sub-strong-weak. A rhythm of a piece of music is formed by organically organizing the length of the sound and the strong beat and weak beat as required.

It may be seen that, the melody includes three factors: a pitch of sound, a length of sound, and the beat. The rhythm only includes two factors: the length of the sound and an intensity of a sound (that is, the beat). Although the melody, rhythm and beat are not concepts at the same level, the melody, rhythm and beat can all reflect the feature of a piece of music in terms of mobility.

According to the above, it may be seen that the melody, rhythm, and beat are strictly defined in music score theory. However, from a perspective of auditory experience of the user, it is difficult for the user to strictly distinguish the melody, rhythm, and beat in the piece of music. Therefore, the feature of music described in subsequent embodiments of this application may be any one of melody, rhythm or beat strictly defined above; or the feature of music may further be obtained, based on the auditory experience of the user, from any two or more combinations of melody, rhythm, or beat. The specific definition of the feature of the music is not limited in the embodiments of this application, as long as the feature of the music can reflect the feature of a piece of music to a certain extent.

For a piece of music, when the electronic device uses the algorithm to obtain relatively strict information such as melody, rhythm, and beat from the piece of music, the feature of any piece of music may be accurately obtained. When non-algorithm is used to obtain information such as melody, rhythm, and beat from a piece of music, for example, when a human ear feels the information such as melody, rhythm, and beat of the music to obtain the feature of the music, such a non-algorithm way to obtain the feature of the music may fully meet the auditory experience of the user. Therefore, in view of meeting the auditory experience of the user and reducing difficulty of processing and analyzing the music file, this application mainly defines the feature of the music as the latter, that is, the feature of the music is obtained, based on the auditory experience of the user, from any one or more combinations of melody, rhythm or beat.

In some other embodiments, the feature of the music may also be referred to as "beat" of the music, where "beat" is only a common word to describe the feature of the music in daily life.

Considering that music has the feature of melody, rhythm, and beat, this application provides an enhanced vibration prompting method, which mainly combines the feature of the music and uses the motor to provide tactile experience, thereby bringing a more integrated and comprehensive experience to the user. Details are as follows:

In the enhanced vibration prompting method provided in this application, the electronic device may first obtain a feature of a piece of music, and obtain standard random vibration information according to the feature of the piece of music. The standard random vibration information includes: a start and end time of vibration of each sub-segment, and vibration intensity and frequency of each sub-segment in the start and end time when driving a motor to vibrate. Then, enhanced random vibration information is obtained based on the standard random vibration information and by any one or more of the following: A vibration intensity in the start and end time of each sub-segment in the standard random vibration information is enhanced to be greater than or equal to a maximum value of vibration intensities in the standard random vibration information; duration whose vibration duration of a sub-segment in the standard random vibration information is less than a first value is prolonged; or an interval whose interval time between two adjacent sub-segments in the standard random vibration information is greater than a second value is shortened. Finally, the electronic device drives the motor to vibrate according to the enhanced random vibration information.

The main functions of standard random vibration information are: enhanced random vibration information which not only matches the feature of the music, but also meets a requirement of the user for a vibration prompt effect is obtained based on the standard random vibration information, to provide the user with interesting and strong touch vibration experience. Details are as follows:

Firstly, the standard random vibration information is vibration information which is best matched with the melody, rhythm, or beat of the music according to the feature of the music.

Secondly, considering that a piece of music has a weak rhythm, a rhythm segment, or a long rhythm interval, so that there are problems of weak vibration, short vibration, and excessive interval between adjacent sub-segments in the standard random vibration information, which leads to weak tactile experience for the user. Therefore, further, according to the standard random vibration information, the enhanced standard random vibration information is obtained by enhancing the weak vibration, prolonging the short vibration, and shortening a sub-segment interval, thereby bringing a vibration prompt effect with stronger tactile experience to the user.

It may be seen that obtaining standard random vibration information is a transitional step to obtain enhanced random vibration information. The enhanced random vibration information obtained based on the standard random vibration information can not only retain the original feature of the music to a certain extent, but also improve the vibration prompt effect to a certain extent. Considering from two dimensions, the requirement of the user for the vibration prompt effect may be fully satisfied.

In conclusion, the standard random vibration information is an intermediate result for obtaining the enhanced random vibration information. In some other embodiments of this application, final enhanced random vibration information may be directly extracted from the feature of the music through another method, instead of obtaining the intermediate result of the standard random vibration information.

It may be seen that, adopting the enhanced vibration prompting method provided in this application has the following advantages:

First, when the electronic device enables a music (which is also referred to as ringing) prompt and an enhanced vibration (which is also referred to as vibration) prompt, and when playing prompt information such as the music, the electronic device may simultaneously drive the motor to vibrate according to the feature of the music, so that the motor outputs enhanced vibration effect of music corresponding to the ringing that has the same or similar rhythm dynamic, and the prompt information is more interesting.

Second, when the electronic device off the music (which is also referred to as ringing) prompt and only enables the enhanced vibration (which is also referred to as vibration) prompt, the motor vibrates according to the enhanced random vibration information, which may enhance the vibration intensity, prolong an original short vibration time, or shorten the vibration interval.

In this way, it may further ensure that the user may get strong vibration prompt information from touch, and may not miss the incoming call, the alarm clock, the SMS message, the memo event, and the like. Because of the instability of melody, beat, or rhythm of the music, the vibration is sometimes strong and sometimes weak, and sometimes there is no vibration for a period of time, so that the user cannot feel the vibration prompt information, thereby missing an important call, a message, a notification, an alarm clock, a memo event, and the like.

Next, the electronic device used for enhanced vibration prompt provided in the application is introduced first, including a form of the electronic device, a software and hardware architecture, and the like.

The electronic device may be a mobile phone, a camera, a smart watch, a sport wristband, a tablet computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an in-vehicle device, a smart home device and/or a smart city device. This is not limited in the embodiments of this application.

FIG. 1 is a schematic diagram of a hardware architecture of an electronic device 100.

As shown in FIG. 1, the electronic device 100 may include: a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in the embodiments of this application does not constitute a specific limitation on the electronic device 100. In some other embodiments of this application, the electronic device 100 may include more or fewer components than those shown in the figure, or some components may be combined, or some components may be split, or components are arranged in different manners. The components in the figure may be implemented by hardware, software, or a combination of software and hardware.

The processor 110 may include one or more processing units. For example: the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a timing signal, to complete control of fetching an instruction and executing the instruction.

A memory may be further arranged in the processor 110, and is configured to store an instruction and data. In some embodiments, the memory in the processor 110 is a cache memory. The memory may store an instruction or data that is recently used or cyclically used by the processor 110. If the processor 110 needs to use the instruction or the data again, the processor 110 may directly invoke the instruction or the data from the memory. Repeated access is avoided, and a waiting time of the processor 110 is reduced, thereby improving system efficiency.

In the embodiments of this application, when the processor 110 detects that prompt information is outputted, for example, when there is an incoming call, an alarm clock, an SMS message, or a memo event reminder, the processor 110 may obtain a corresponding music file from the memory, extract corresponding enhanced random vibration information from the music file, and then control the motor to vibrate according to the enhanced random vibration information.

The manner of extracting the corresponding enhanced random vibration information from the music file by the processor 110 is not limited in this application. For example:

In some embodiments of this application, the processor 110 may obtain a feature of the music directly from the music file, then calculate standard random vibration information based on the feature of the music, and finally calculate enhanced random vibration information based on the standard random vibration information. In this case, the directly obtained feature of the music may be comprehensive feature information extracted manually from the music in advance. Reference may be made to the feature of the music in the previous definition, and details are not described herein.

In some other embodiments of this application, the processor 110 may adopt an algorithm to calculate a feature of the music from the music file, then calculate standard random vibration information based on the feature of the music, and finally calculate enhanced random vibration information based on the standard random vibration information. In this case, the feature of the music obtained by calculation may be any one of melody, rhythm, or beat in the music. Reference may be made to the feature of the music in the previous definition, and details are not described herein.

It may be understood that, the processor 110 may directly obtain the enhanced random vibration information based on the feature of the music without first calculating the standard random vibration information, and a specific implementation process of calculating the enhanced random vibration information according to the feature of the music is not limited in this application.

The internal memory 121 may include one or more random access memories (random access memories, RAM) and one or more non-volatile memories (non-volatile memory, NVM).

The external memory interface 120 may be configured to connect to an external non-volatile memory, to expand a storage capability of the electronic device 100. The external non-volatile memory communicates with the processor 110 by using the external memory interface 120, to implement a data storage function. For example, storing a file such as a music or a video in the external non-volatile memory.

In the embodiments of this application, music files, music features, standard random vibration information, and enhanced random vibration information corresponding to various prompt information may be pre-stored in the memory.

When the processor 110 directly obtains the feature of the music from the music file, the music file stored in the memory includes information related to the feature of the music obtained manually in advance.

The motor 191 may generate an enhanced vibration prompt. The motor 191 may be configured to perform enhanced vibration prompt when the electronic device detects an event such as the incoming call, the message, the notification, the alarm clock, the memo event, the game start, or the video playing, and may further be configured to touch a vibration feedback. For example, touch operations performed on different applications (for example, photo taking and audio playing) may correspond to different vibration feedback effects. For touch operations performed on different regions of the display screen 194, the motor 191 may further correspond to different vibration feedback effects. Different application scenarios (for example, a time reminder, information receiving, an alarm clock, and a game) may further correspond to different vibration feedback effects. A touch vibration feedback effect may be further customized.

In the embodiments of this application, a specific type of the motor 191 is a linear motor. Compared with a traditional rotor motor, the linear motor shortens a vibration delay time and avoids a phenomenon of vibration trailing. The linear motor may bring better vibration experience to the user. Specifically, the linear motor mainly includes a stator and a promoter. The promoter mainly includes a special mass block, a spring, and a magnet, and the stator includes a flexible printed circuit board (Flexible Printed Circuit board) FPC and a surrounding coil. When the linear motor receives a driving signal, a stator coil in the linear motor is energized. Due to an existence of magnetic field, according to a magnetic effect of current discovered by a physicist Oersted, the stator is subjected to a magnetic field force, which drives the promoter to move in a specific direction, for example, a transverse direction, that is, a left-right direction, thereby generating a feeling of vibration. It may be seen that, a working principle of the linear motor is similar to that of a pile driver. The linear motor mainly converts electric energy into mechanical energy, directly converts the electric energy into linear motion mechanical energy, and drives a spring mass block to move linearly, thereby generating vibration. The vibration brings the user a sense of vibration similar to an effect of "Dadada".

A wireless communication function of the electronic device 100 may be implemented through the antenna 1, the antenna 2, the mobile communication module 150, the wireless communication module 160, the modem processor, the baseband processor, and the like.

In some embodiments, the antenna 1 of the electronic device 100 is coupled to the mobile communication module 150, and the antenna 2 is coupled to the wireless communication module 160, so that the electronic device 100 may communicate with a network and another device through a wireless communication technology.

In the embodiments of this application, the antenna 1 of the electronic device 100 is coupled to the mobile communication module 150, so that the electronic device 100, when receiving a cellular incoming call, can output, for example, enhanced vibration prompt information to remind the user that it is possible to communicate with another device through the wireless communication technology.

In the embodiments of this application, the antenna 2 of the electronic device 100 is coupled to the wireless communication module 160, so that the electronic device 100, when receiving a network incoming call, can output, for example, enhanced vibration prompt information to remind the user that it is possible to communicate with another device through the wireless communication technology.

The electronic device 100 implements a display function through the GPU, the display screen 194, the application processor, and the like. The GPU is a microprocessor for image processing, and is connected to the display screen 194 and the application processor. The GPU is configured to perform mathematical and geometric calculations and perform graphics rendering. The processor 110 may include one or more GPUs and execute program instructions to generate or change display information.

The display screen 194 is configured to display an image, a video, or the like. The display screen 194 includes a display panel. A liquid crystal display (liquid crystal display, LCD) may be used as a display panel. The display panel may be an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device 100 may include 1 or N display screens 194, and N is a positive integer greater than 1.

In the embodiments of this application, the display screen 194 of the electronic device may display relevant setting options with prompt information such as sound and vibration. Specifically, the user may set a type of the prompt information on the detail page of sound and vibration or in the pull-down notification bar, that is, set a sound mode. For example, any one or more such as a music (which is also referred to as a bell) prompt, an enhanced vibration (which is also referred to as vibration) prompt, mute (which is also referred to as do-not-disturb), a notification bar prompt, or an indicator light prompt.

The option of the enhanced vibration prompt may be enabled by default by the electronic device, or the user may manually choose to enable the enhanced vibration. This is not limited in the embodiments of this application.

Figure 3A:
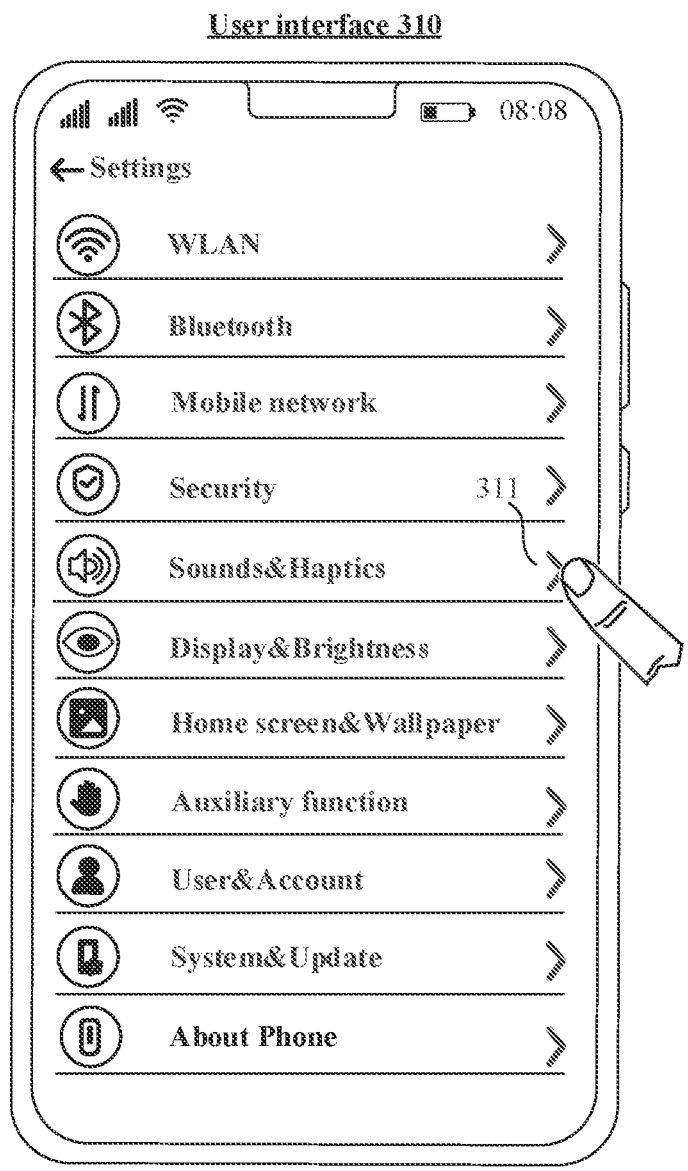
FIG. 3A to FIG. 3C are schematic diagrams of a group of user interfaces according to an embodiment of this application.
Figure 3B:
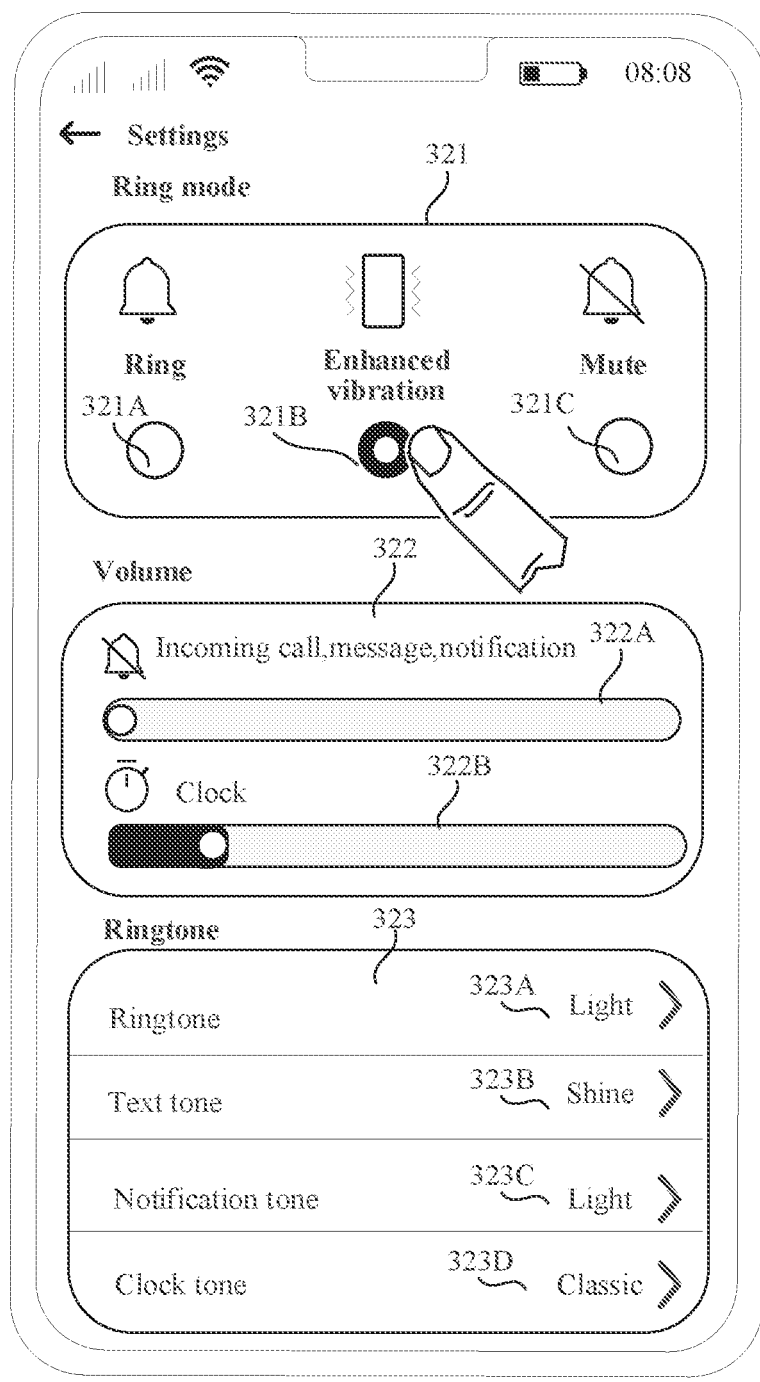

The user interface in which the display screen 194 displays a setting option related to prompt information such as sound and vibration may be specifically referred to the following description of UI embodiments shown in FIG. 3A to FIG. 3B, and details are not repeated herein.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

In the embodiments of this application, when obtaining the feature of the music from the music file through an algorithm, the processor 110 may specifically perform calculation through a digital signal processor. For an introduction of the algorithm, reference is made to the method embodiment hereafter, and details are not repeated herein.

The video codec is configured to compress or decompress a digital video. The electronic device 100 may support one or more video codecs. In this way, the electronic device 100 may play or record videos in a plurality of encoding formats, for example: moving picture experts group (moving picture experts group, MPEG) 1, MPEG 2, MPEG 3, and MPEG 4.

In the embodiments of this application, when the processor 110 obtains the feature of the music from the music file through an algorithm, the video codec may further decompress a compressed music file for the digital signal processor to calculate the decompressed music file to obtain the feature of the music. For an introduction of the algorithm, reference is made to the method embodiment hereafter, and details are not repeated herein.

The electronic device 100 may implement an audio function by using an audio module 170, a speaker 170A, a phone receiver 170B, a microphone 170C, a headset jack 170D, an application processor, and the like. For example, music playing or recording.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "speaker", is configured to convert an audio electrical signal into a sound signal. Music may be listened to or a hands-free call may be answered by using the speaker 170A in the electronic device 100.

The phone receiver 170B, also referred to as a "receiver", is configured to convert an audio electrical signal into a sound signal. When the electronic device 100 is used to answer a call or receive voice information, the phone receiver 170B may be put close to a human ear, to receive a voice.

The headset jack 170D is configured to connect a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

In the embodiments of this application, the audio module 170 may be configured to convert music prompt information from a digital signal into an analog signal and play the music prompt information through the speaker 170A or an earphone connected to the headset jack 170D.

In the embodiments of this application, the electronic device 100 may detect a user acting on a control displayed in the display screen 194 through the pressure sensor 180A and/or the touch sensor 180K, to perform a corresponding function. For example, it may be detected that the user enables an operation of an enhanced vibration function, and then the electronic device 100 enables the enhanced vibration function, so that the motor may output enhanced vibration prompt information according to the above-described enhanced vibration prompting method.

A button 190 includes a power button, a volume button, and the like. The button 190 may be a mechanical button, or may be a touch-type button. The electronic device 100 may receive a button input, and generate a button signal input related to user setting and function control of the electronic device 100.

In the embodiments of this application, a user may raise, lower, or turn off a volume of music through the volume button.

The electronic device 100 may be a portable terminal device carrying an iOS®, an Android®, a Microsoft®, or another operating system. The operating system used by the electronic device 100 is not limited in the embodiments of this application.

A software system of the electronic device 100 may use a layered architecture, an event-driven architecture, a microkernel architecture, a micro service architecture, or a cloud architecture. In the embodiments of this application, an Android® system with a layered architecture is used as an example to illustrate a software structure of the electronic device 100.

Figure 2:
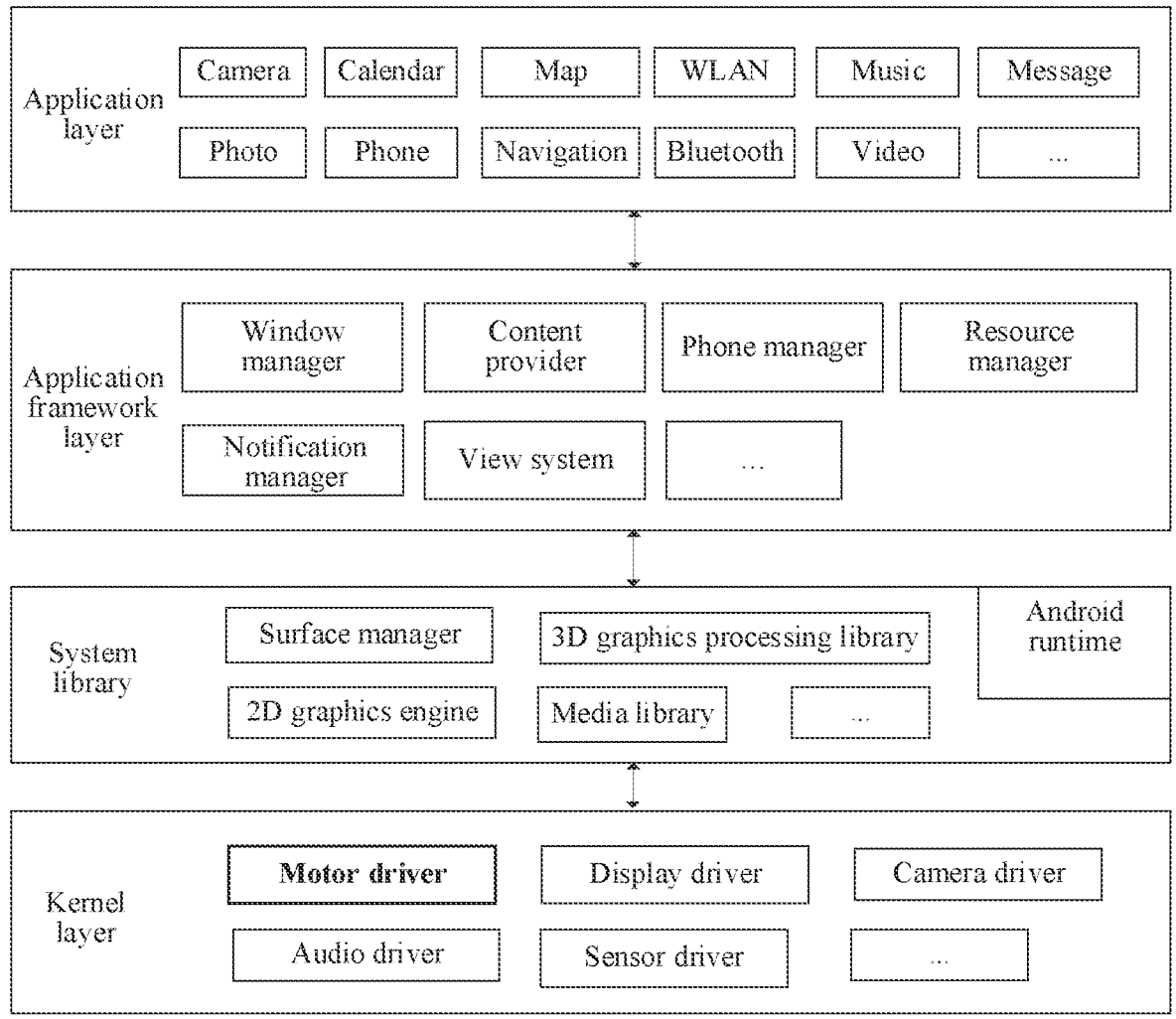
FIG. 2 is a schematic diagram of a software architecture of an electronic device 100 according to an embodiment of this application.

Then, FIG. 2 is a schematic diagram of a software architecture of an electronic device 100.

In the layered architecture, software is divided into several layers, and each layer has a clear role and task. Layers communicate with each other through a software interface. In some embodiments, the Android system is divided into four layers, namely, an application layer, an application framework layer, an Android runtime (Android runtime) and system library, and a kernel layer from top to bottom.

The application layer may include a series of application packages.

As shown in FIG. 2, the application packages may include applications such as camera, photos, calendar, phone, maps, navigation, WLAN, Bluetooth, music, videos, and SMS messages, or may include setting applications not shown in FIG. 2.

In the setting application, the user may be provided with a setting option related to prompt information such as sound and vibration. Reference may be specifically made to the following description of UI embodiments shown in FIG. 3A to FIG. 3B, and details are not repeated herein.

The application framework layer provides an application programming interface (application programming interface, API) and a programming framework for the applications at the application layer. The application framework layer includes some predefined functions.

As shown in FIG. 2, the application framework layer may include a window manager, a content provider, a view system, a phone manager, a resource manager, a notification manager, and the like.

The Android Runtime includes a core library and a virtual machine. The Android runtime is responsible for scheduling and managing the Android system.

The core library includes two parts: one part is a function that the Java language needs to invoke, and the other part is a core library of Android.

The application layer and the application framework layer run on the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules. For example: such as a surface manager (surface manager), a media library (Media Libraries), a three-dimensional graphics processing library (for example, OpenGL ES), a 2D graphics engine (for example, SGL), and the like.

The surface manager is configured to manage a display subsystem, and converge 2D and 3D layers of a plurality of applications.

The media library supports playback and recording of a plurality of common audio and video formats, a static image file, and the like. The media library may support a plurality of audio and video encoding formats, for example: MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawings.

The kernel layer is a layer between hardware and software. The kernel layer includes at least a motor driver, a display driver, a camera driver, an audio driver, and a sensor driver.

In the embodiments of this application, the motor driver may drive the motor to vibrate based on the enhanced random vibration information obtained by the processor 110.

Based on the software and hardware architecture of the electronic device 100 described above, the enhanced vibration prompting method provided in this application is described with reference to a UI embodiment shown below in FIG. 3A to FIG. 3C.

FIG. 3A shows an example of a setting interface displayed by an electronic device.

As shown in FIG. 3A, a user interface 310 is a user interface provided for a setting application of the electronic device. The user interface 310 displays a series of setting options, including a sound and vibration option 311. The user may tap the option to access the detail page of the sound and vibration, and reference may be specifically made to the user interface shown in FIG. 3B.

FIG. 3B shows an example of a detail page corresponding to sound and vibration displayed by an electronic device.

As shown in FIG. 3B, the user interface 320 is a detail page corresponding to the sound and vibration. A sound mode setting module 321, a volume adjustment module 322, and a ringtone setting module 323 are displayed in the user interface 320.

The sound mode setting module 321 displays three mode options, including: a ringing option 321A, an enhanced vibration option 321B, and a mute option 321C.

The names corresponding to the three options are only examples and should not be considered as a limitation on this application. For example, a name of option 321B, that is, "enhanced vibration", is only an example. In some other embodiments of this application, "enhanced vibration" may also be referred to as "vibration". The name corresponding to the option 321B is not displayed in the embodiments of this application, and a specific function corresponding to the option 321B is described as follows:

When the user selects the ringing option 321A, the electronic device 100 may ring to prompt the user when it is detected that there are events such as an incoming call, a message, a notification, an alarm clock, a memo event, game start, or video playing. Specifically, the audio module 170 of the electronic device 100 prompts the user by playing music corresponding to events such as the incoming call, the message, the notification, the alarm clock, the memo event, the game start, or the video playing.

When the user selects the enhanced vibration option 321B, the electronic device 100 may prompt the user by outputting an enhanced vibration effect. Specifically, the motor of the electronic device 100 may vibrate based on a feature of music corresponding to the foregoing events such as the incoming call, the message, the notification, the alarm clock, the memo event, the game start, or the video playing, to prompt the user.

When the user selects the mute option 321C, the electronic device 100 does not output music and vibration prompt information when it is detected that there are events such as the incoming call, the message, the notification, the alarm clock, the memo event, the game start, or the video playing.

The volume adjustment module 322 displays a control bar for adjusting a volume when ringing, namely 322A; and a control bar for adjusting a corresponding music when ringing, namely 322B. The user may control the volume by sliding left and right in the two control bars.

An incoming call ringtone option 323A, a message ringtone option 323B, a notification ringtone option 323C, and an alarm clock ringtone option 323D are displayed in the ringtone setting module 323. The user may select ringing music corresponding to the incoming call, the message, the notification, the alarm clock, and the memo event by selecting corresponding options. The ringing music may be a music file pre-stored in the electronic device 100 before the electronic device 100 leaves a factory or a music file downloaded by the user. This is not limited in the embodiments of this application.

It may be understood that, the contents shown in FIG. 3B are merely an example. In some other embodiments of this application, FIG. 3B may further be configured to set an enhancement level option. The enhancement level is related to a vibration intensity and vibration time of the motor. Specifically, when the enhancement level is higher, the vibration intensity of the motor may be greater, or the time interval between each sub-segment during vibration may be shorter, so that the vibration effect outputted by the electronic device is stronger.

It may be understood that, FIG. 3A to FIG. 3B are merely examples of one implementation in which the electronic device 100 enables the enhanced vibration function. In some other embodiments of this application, the user may further cause the electronic device 100 to enable the enhanced vibration function through a pull-down notification bar and by selecting the enhanced vibration option provided in the notification bar; or the user may further cause the electronic device to enable the enhanced vibration function by inputting a voice instruction. The manner of enabling the enhanced vibration function is not limited in the embodiments of this application.

Figure 3C:
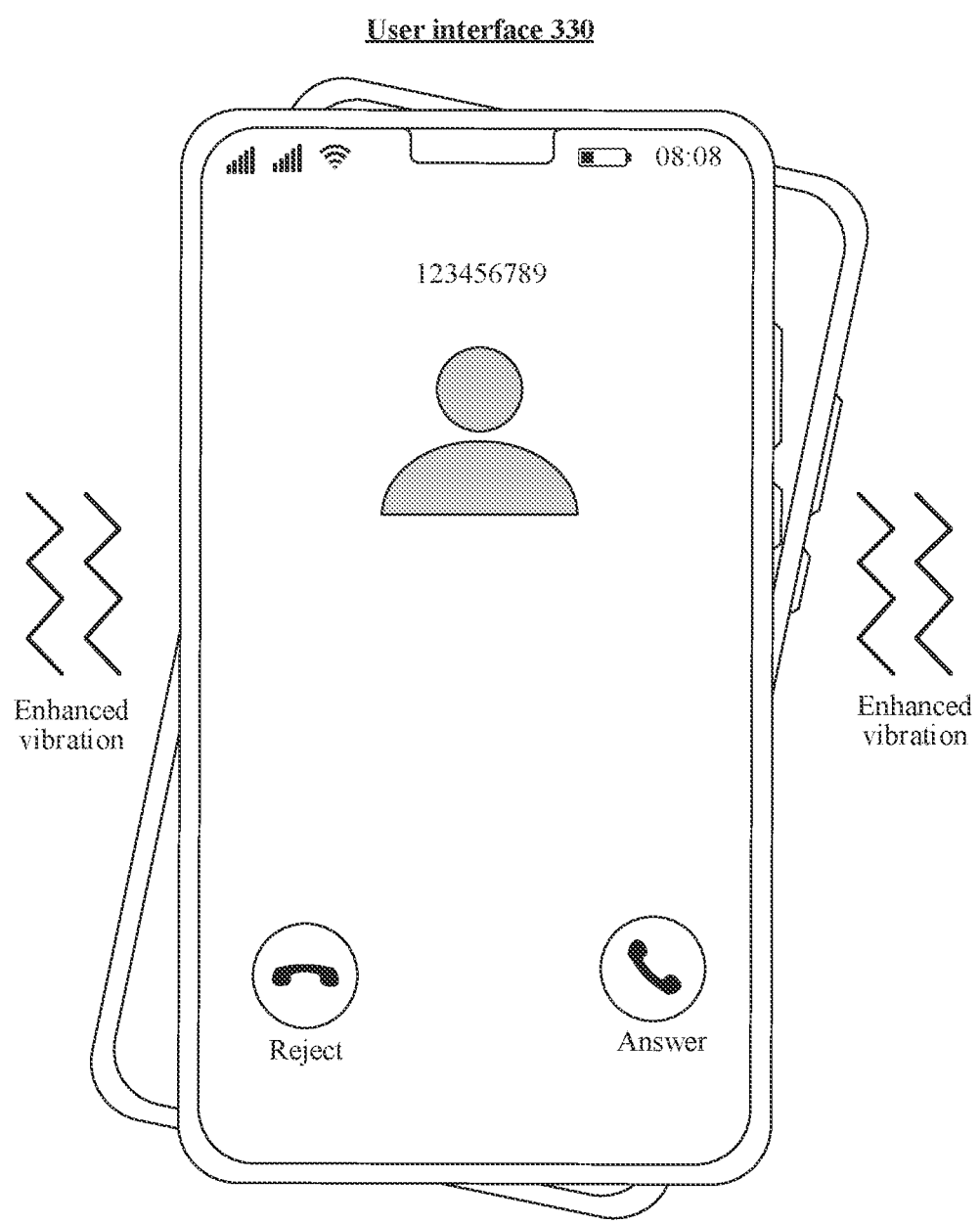

It is assumed that when the user selects an option corresponding to the enhanced vibration 321B shown in FIG. 3B and sets an incoming call ringtone to be music "Light", a message ringtone to be music "Shine", a notification ringtone to be the music "Light", and an alarm clock ringtone to be music "Classic", the electronic device outputs the enhanced vibration effect corresponding to the feature of the corresponding music when it is detected that there are events such as the incoming call, the message, the notification, the alarm clock, and the memo event. Details are as follows:

FIG. 3C shows an example of a schematic diagram of a scenario when an electronic device detects an incoming call.

As shown in FIG. 3C, when the electronic device 100 detects the incoming call, the electronic device 100 not only controls the display screen 194 to display an incoming call prompt interface 330, but also controls the motor to output an enhanced vibration effect corresponding to incoming call music "Light".

It may be seen that, when the electronic device 100 detects the incoming call, that is, the bell of the electronic device 100 is off, or the electronic device 100 of the user is placed in a pocket or on a desk, or the user is in a noisy environment, so that the user cannot hear the music "Light". However, the user can still feel that the electronic device 100 controls the motor to output the enhanced vibration effect corresponding to the incoming call music "Light", thereby avoiding occurrence of similar events such as missing a call and improving user experience.

It may be understood that, FIG. 3C only shows an example in which when detecting an event such as the incoming call, the electronic device outputs enhanced vibration prompt information corresponding to the incoming call music. In some other embodiments of this application, when the electronic device detects two conflict events, for example, when the electronic device outputs the enhanced vibration prompt information corresponding to the music in a video/game during playing a video/game, and detects the incoming call, the message, the notification, the alarm clock, or the memo event, the electronic device may be switched to output the enhanced vibration prompt information corresponding to the music of the incoming call, the message, the notification, the alarm clock, or the memo event until the user answers/hangs up the phone, looks at the message, the notification, or the memo event, or turns off the alarm clock to trigger the electronic device to stop outputting the enhanced vibration prompt information corresponding to the music of the incoming call, the message, the notification, the alarm clock, or the memo event, or until the electronic device automatically stops outputting the enhanced vibration prompt information corresponding to the music of the incoming call, the message, the notification, the alarm clock, or the memo event, the electronic device continues to output enhanced vibration prompt information corresponding to the music in the video/game.

It may be understood that, when the user selects the ringing option 321A and the enhanced vibration option 321B, the electronic device 100 not only outputs a corresponding music to prompt the user, but also outputs a corresponding enhanced vibration effect according to the feature of the music to prompt the user when it is detected that there is an event such as the incoming call, the message, the notification, the alarm clock, the memo event, the game start, or the video playing. For a detailed implementation of the electronic device 100 outputting a corresponding enhanced vibration effect according to the feature of the music, reference may be made to the detailed description of a method process below, and details are not described herein.

Then, an enhanced vibration prompting method provided in this application will be described in detail with reference to FIG. 4.

Figure 4:
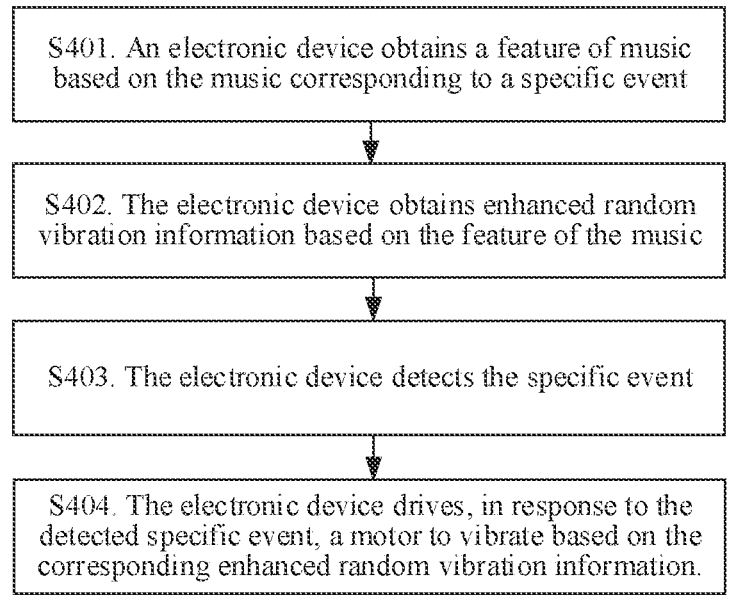
FIG. 4 is a schematic flowchart of an enhanced vibration prompting method according to an embodiment of this application.

FIG. 4 shows an example of a process of an enhanced vibration prompting method according to this application. The method process includes the following steps:

S401. An electronic device obtains a feature of music based on the music corresponding to a specific event.

In some embodiments, when the electronic device 100 detects that there is an event such as an incoming call, a message, a notification, an alarm clock, or a memo, the electronic device 100 obtains a music file corresponding to an event such as the incoming call, the message, the notification, the alarm clock, or the memo when ringing, and then obtains the feature of the music from the music file.

In some other embodiments, after the electronic device 100 detects that the music set by the user when an event such as an incoming call, a message, a notification, an alarm clock, and a memo when ringing, the electronic device may obtain music files corresponding to the events based on the set music, and obtain the feature of the music from the music files.

When ringing, the music files corresponding to events such as the incoming call, the message, the notification, the alarm clock, and the memo are set by default by the electronic device 100. The music files may further be re-selected by the user. In the method of setting the music corresponding to the events by the user when the bell is ringing, reference may be made to the introduction of FIG. 3B in the UI embodiment above, and details are not repeated herein.

A feature of a piece of music includes: A start and end time of music corresponding to a plurality of sub-segments in the piece of music, and information such as sound intensity and frequency of music in each sub-segment. The plurality of sub-segments in the piece of music may be divided according to one or more features of melody, rhythm and beat of music, and details are as follows:

The specific implementation method of the electronic device 100 obtaining the feature of the music according to the music file is as follows:

Manner 1: The feature of the music is pre-stored in the music file, and the processor 110 of the electronic device 100 may directly extract the feature of the music after obtaining the music file from the memory. The feature of the music is pre-stored in the music file, which may be obtained manually.

Figure 5:
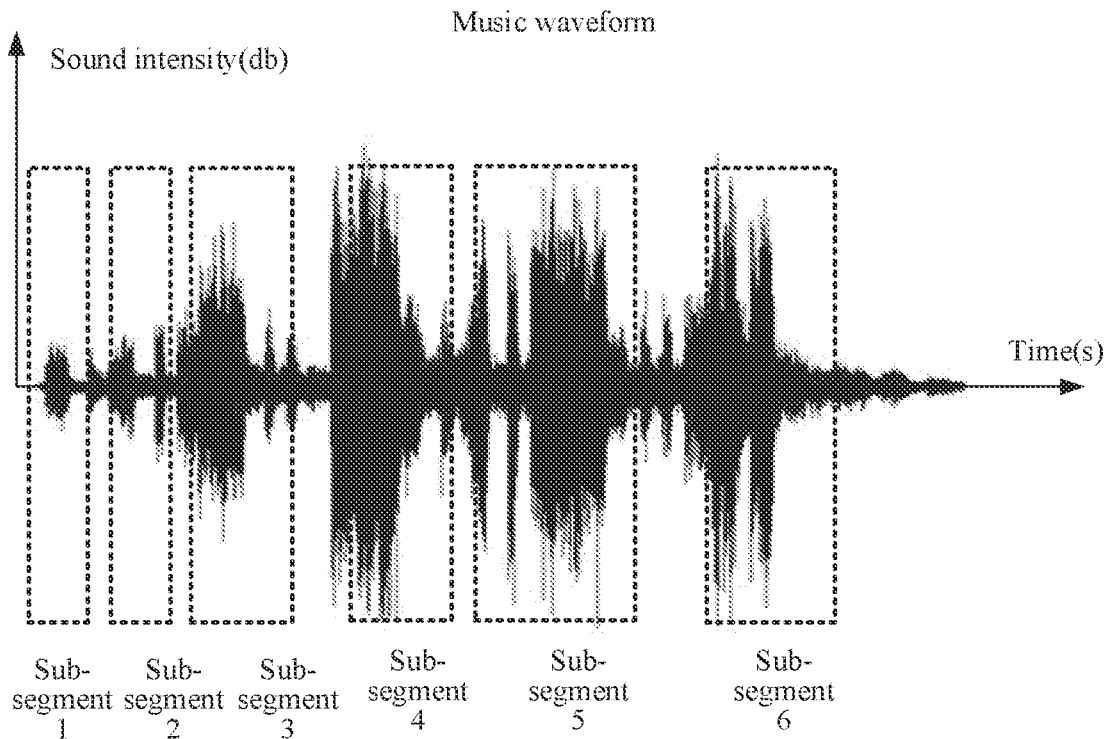
FIG. 5 is a schematic diagram of a music waveform according to an embodiment of this application.

The specific implementation of manually obtaining the feature of the music is as follows:

FIG. 5 shows an example of a waveform diagram of a piece of music.

As shown in FIG. 5, the waveform diagram of the piece of music may be, for example, the "Light" music corresponding to the incoming call ringing described above. A horizontal axis of the music waveform is a time when the music is played, and a vertical axis is a sound intensity when the music is played, that is, a boost level.

A developer may extract a feature of music "Light" while listening to the music "Light". The feature of the "Light" music includes: a start and end time of each sub-segment, and information such as sound intensity and frequency of music in each sub-segment.

For example, when the music is played, it is recorded that sub-segment 1 starts from the second second to the third second, sub-segment 2 starts from the fifth second to the sixth second, sub-segment 3 starts from the eighth second to the ninth second, sub-segment 4 starts from the twelfth second to the fourteenth second, sub-segment 5 starts from the sixteenth second to the nineteenth second, and sub-segment 6 starts from the twenty-third second to the twenty-fifth second.

In addition, the developer also records sound intensity and frequency of the music in each sub-segment. For example, the frequency of music in the sub-segment 1 is in a range of 50 Hz to 200 Hz (Hz), the sound intensity is 40 db, the frequency of music in the sub-segment 1 is in a range of 250 Hz to 500 Hz, the sound intensity is 50 db, and the frequency of music in the sub-segment 3 is greater than 500 Hz, the sound intensity is 60 db, and details are not described herein again.

In addition, the developer for extracting the feature of the music may be a professional musician with strong music sense and music theory knowledge.

Manner 2: There is no feature of music pre-stored in the music file. After the processor 110 of the electronic device 100 obtains the music file from the memory, the processor 110 may invoke the video codec to decompress the music file, and then the digital signal processor calculates the decompressed music file through an algorithm to extract the feature of the music. The algorithm for extracting the feature of the music specifically includes: extracting through music beat point, extracting through frequency, extracting through different loudness, extracting through a combination of frequency and loudness, extracting through AI/neural network processing, and the like.

Figure 6:
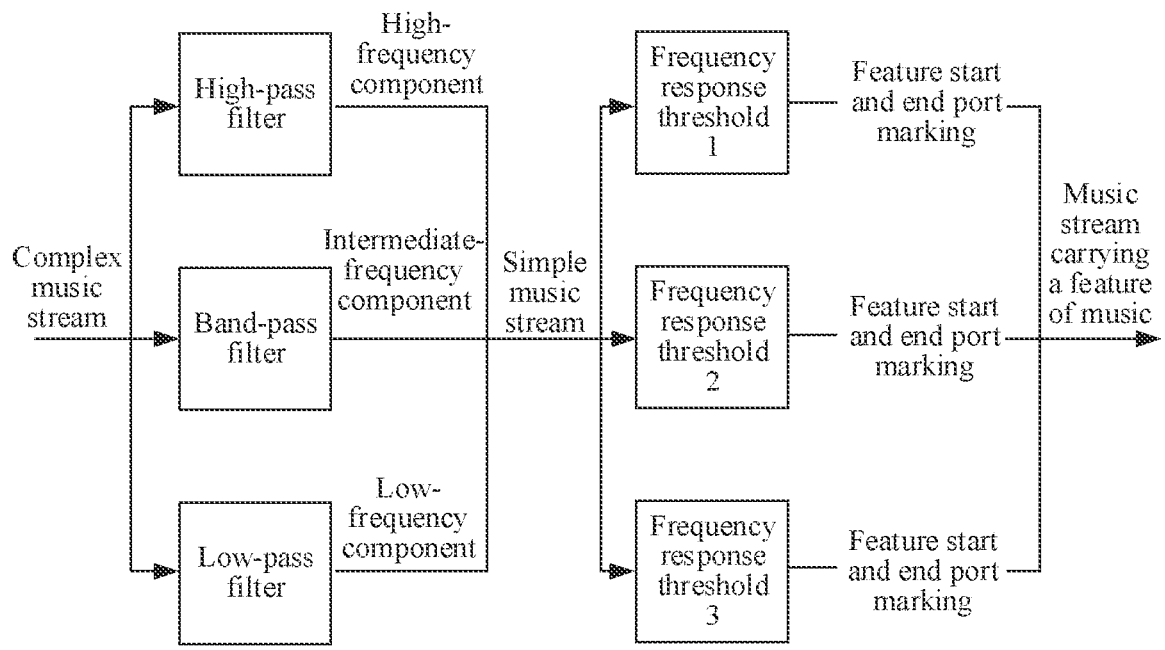
FIG. 6 is a schematic diagram of an algorithm framework for extracting a feature of music according to an embodiment of this application.

Only an example in which an algorithm for extracting the feature of the music through frequency is used for description in the embodiments of this application. The specific implementation is as follows:

FIG. 6 shows an example of a schematic diagram of an algorithm framework for extracting a feature of music.

As shown in FIG. 6, the algorithm framework includes modules such as high-pass, band-pass and low-pass filters, frequency response threshold, and a mark feature starting point.

First, the video codec in the electronic device 100 decompresses the music file to obtain a music stream. Generally, the music stream includes a vocal and various musical instrument sounds, so the decompressed music stream is a complex music stream with a plurality of channels. Therefore, the high-pass, band-pass and low-pass filters are configured to extract a high-frequency component, an intermediate-frequency component, and a low-frequency component of the music stream. Then, the obtained high-frequency component, intermediate frequency component, and low frequency component are integrated into a simple music stream.

After that, the simple music stream is inputted into frequency response threshold 1, frequency response threshold 2, and frequency response threshold 3. The frequency response threshold 1 is configured to mark a feature point where frequency of a music signal in the high-frequency component is greater than a first preset frequency, mark the feature point again at a turning point from greater than the first preset frequency to less than the first preset frequency, and extract the frequency and sound intensity of each pair of music streams between the feature points from greater than the first preset frequency to less than the first preset frequency. Similarly, the frequency response threshold 2 is configured to mark a feature point where the frequency of the music signal in the intermediate-frequency component is greater than a second preset frequency, mark the feature point again at a turning point from greater than the second preset frequency to less than the second preset frequency, and extract the frequency and sound intensity of each pair of music streams between the feature points from greater than the second preset frequency to less than the second preset frequency. Similarly, the frequency response threshold 3 is configured to mark a feature point where the frequency of the music signal in the intermediate-frequency component is greater than a third preset frequency, mark the feature point again at a turning point from greater than the third preset frequency to less than the third preset frequency, and extract the frequency and sound intensity of each pair of music streams from the feature points greater than the third preset frequency to less than the third preset frequency.

Finally, the music streams marked with the feature starting and ending point outputted by the frequency response threshold 1, the frequency response threshold 2, and the frequency response threshold 3 are combined into a music stream, and the music stream carries features of the music, including a feature starting and ending point (which is equivalent to a sub-segment starting and ending point), and information such as frequency and sound intensity of each sub-segment.

S402. The electronic device obtains enhanced random vibration information based on the feature of the music.

Specifically, in a possible implementation, the electronic device 100 obtains corresponding standard random vibration information based on the feature of the music and then obtains enhanced random vibration information based on the standard random vibration information. In another possible implementation, the electronic device 100 may directly obtain corresponding enhanced random vibration information based on the feature of the music.

The embodiments of this application specifically take the basis of manually obtaining a feature of music as an example, and then introduce the foregoing first possible implementation, which is specifically as follows:

First, the electronic device 100 obtains corresponding standard random vibration information according to the feature of the music, where the standard random vibration information includes start and end time of motor vibration, vibration intensity, and vibration frequency in each sub-segment.

Figure 7:
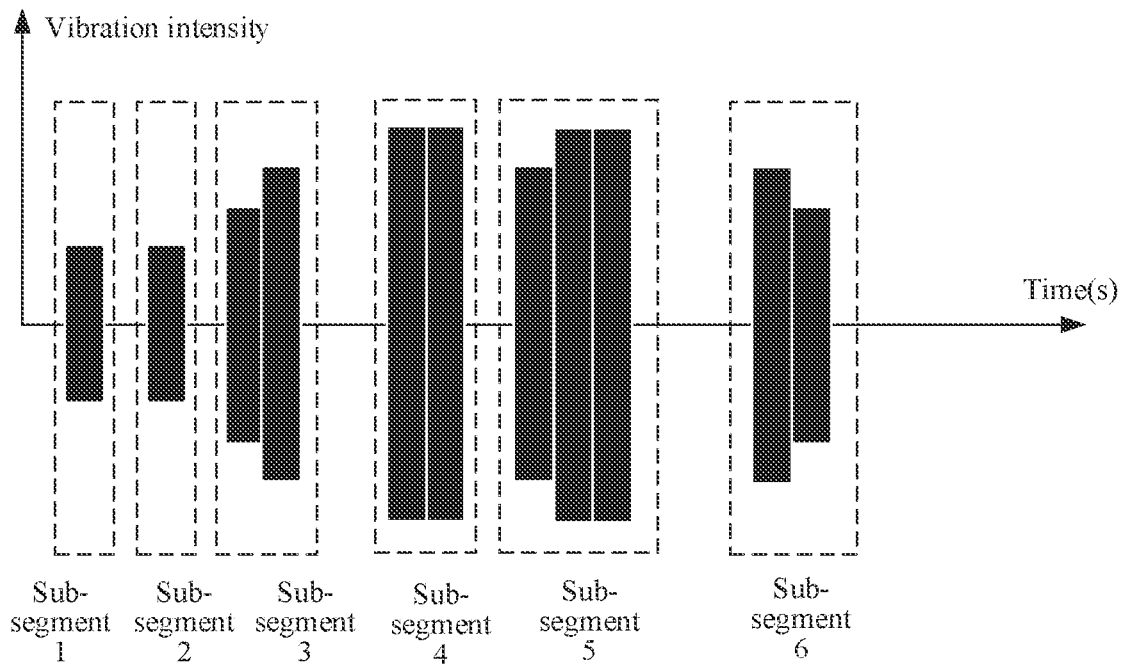
FIG. 7 is a schematic diagram of a standard random vibration waveform according to an embodiment of this application.

FIG. 7 shows an example of a schematic diagram of a standard random vibration waveform generated according to standard random vibration information.

As shown in FIG. 7, the standard random vibration waveform includes a plurality of segments of vibration, and start and end time of each segment of vibration corresponds to the start and end time of feature points in the music waveform shown in FIG. 5 above. In each segment of vibration, duration of vibration, vibration intensity, and vibration frequency may be the same or different.

Duration of motor vibration is duration of a feature in a certain music playing. For example, duration of a first segment (sub-segment 1*a*) vibration is the same as duration of sub-segment 1 extracted manually from the music waveform, and duration of a second segment (sub-segment 2*a*) vibration is the same as duration of sub-segment 2 extracted manually from the music waveform.

The intensity of vibration corresponds to the intensity of music one by one. Specifically, corresponding vibration intensity of music whose sound intensity is greater than a first level is first vibration intensity, corresponding vibration intensity of music whose sound intensity is less than or equal to the first level and greater than a second level is second vibration intensity, corresponding vibration intensity of music whose sound intensity is less than or equal to the second level and greater than a third level is third vibration intensity, and corresponding vibration intensity of music whose sound intensity is less than or equal to the third level is fourth vibration intensity. The sound intensity of the first level is greater than that of the second level, and the sound intensity of the second level is greater than that of the third level; the first vibration intensity is greater than the second vibration intensity, the second vibration intensity is greater than the third vibration intensity, and the third vibration intensity is greater than the fourth vibration intensity. For example, if sound intensity in the sub-segment 1 of the music waveform is less than the third level, vibration intensity in the sub-segment 1 of the standard random vibration waveform is the fourth vibration intensity. In another example, if sound intensity of a previous beat in the sub-segment 3 of the music waveform is less than or equal to the second level and greater than the third level, vibration intensity in the sub-segment 3 of the standard random vibration waveform is the third vibration intensity. In another example, if sound intensity of a latter beat in the sub-segment 3 of the music waveform is less than or equal to the first level and greater than the second level, vibration intensity in the sub-segment 3 of the standard random vibration waveform is the second vibration intensity. It may be understood that a division of sound intensity level and a division of vibration intensity herein are only examples. In some other embodiments, the above division result may include more or fewer levels, which is not limited in the embodiments of this application.

The frequency of vibration corresponds to the frequency of music one by one. Specifically, when the frequency of the music is greater than the first preset frequency, the first preset frequency is used to vibrate, and when the frequency of the music is less than the first preset frequency, the second preset frequency is used to vibrate. It may be understood that a division of music frequency and a division of vibration frequency herein are only examples. In some other embodiments, the above division result may include more or fewer levels, which is not limited in the embodiments of this application.

Then, the electronic device 100 obtains enhanced random vibration information based on standard random vibration information. The standard random vibration information includes start and end time of motor vibration, vibration intensity, and vibration frequency in each sub-segment.

Figure 8:
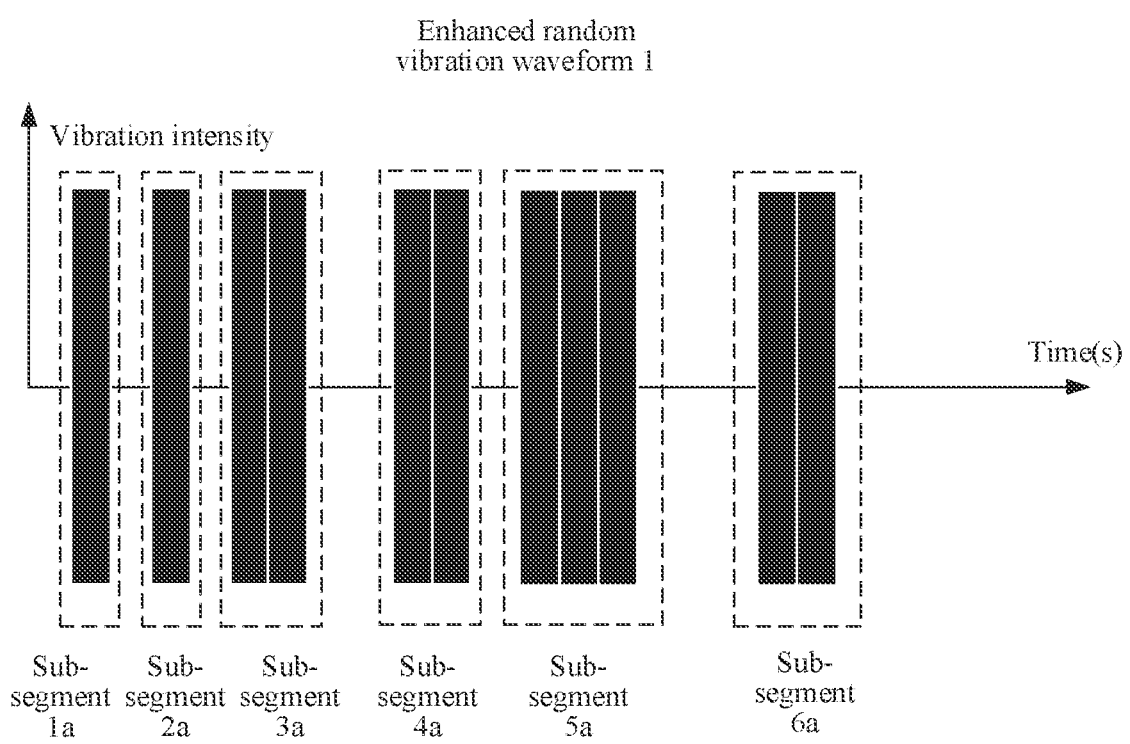
FIG. 8 is a schematic diagram of an enhanced random vibration waveform according to an embodiment of this application.

In the embodiments of this application, a manner of obtaining the enhanced random vibration information based on the standard random vibration information may be any of the following, or a combination of the following, and details are as follows:

Manner 1: A vibration intensity of each sub-segment in the standard random vibration information is enhanced to obtain the enhanced random vibration information. FIG. 8 shows an example of an enhanced random vibration waveform 1 outputted by using the enhanced random vibration information obtained in manner 1.

As shown in FIG. 8, an intensity of the enhanced vibration waveform 1 is greater than or equal to a maximum value (that is, the first vibration intensity described above) of the vibration intensities in the standard random vibration waveform. In addition, a start and end time of each vibration in the enhanced vibration waveform 1 is consistent with that in the standard random vibration waveform, and a frequency of each vibration in the enhanced vibration waveform 1 is also consistent with that in the standard random vibration waveform. That is, a sub-segment 1*a* in the enhanced random vibration waveform 1 has a same vibration frequency and a same vibration start and end time as the sub-segment 1 in the standard random vibration waveform, and a sub-segment 2*a* in the enhanced random vibration waveform 1 has a same vibration frequency and a same vibration start and end time as the sub-segment 2 in the standard random vibration waveform.

Manner 2: A vibration time for which a vibration time period of each sub-segment in the standard random vibration information is less than a second value is prolonged to obtain the enhanced random vibration information.

Figure 9:
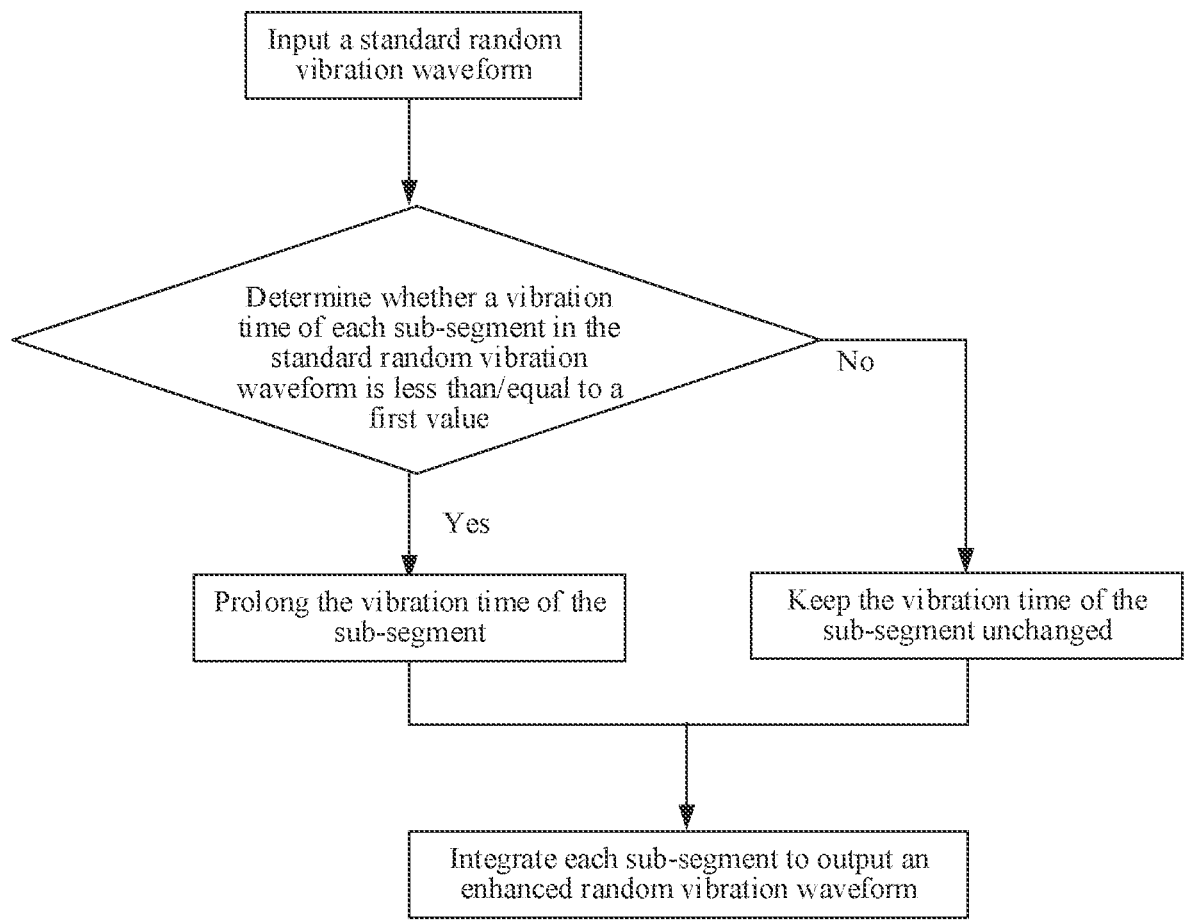
FIG. 9 is a schematic flowchart of a method for prolonging a vibration time of a sub-segment according to an embodiment of this application.

FIG. 9 shows an example of a schematic flowchart of a method for prolonging a vibration time of a sub-segment.

As shown in FIG. 9, the electronic device may determine, based on the standard random vibration waveform shown in FIG. 7, whether a vibration time of each sub-segment in the standard random vibration waveform is less than or equal to a first value. For example, the first value is 1 second. When it is determined that a vibration time of a sub-segment is less than (or equal to) 1 second, the vibration time of the sub-segment is prolonged by a value (for example, 0.5 second); and when it is determined that the vibration time of the sub-segment is greater than 1 second, the vibration time of the sub-segment is kept unchanged. In addition, the vibration intensity of each sub-segment is consistent with the vibration intensity of the random vibration waveform, and the vibration frequency is also consistent. Finally, each sub-segment is integrated to obtain the enhanced random vibration waveform.

The method for prolonging the vibration time of the sub-segment includes: prolonging a vibration end time of a sub-segment, and/or advancing a vibration start time of a sub-segment, to prolong duration of vibration.

Manner 3: An interval whose vibration time between two adjacent sub-segments in the standard random vibration information is greater than a second value is shortened to obtain the enhanced random vibration information.

Figure 10:
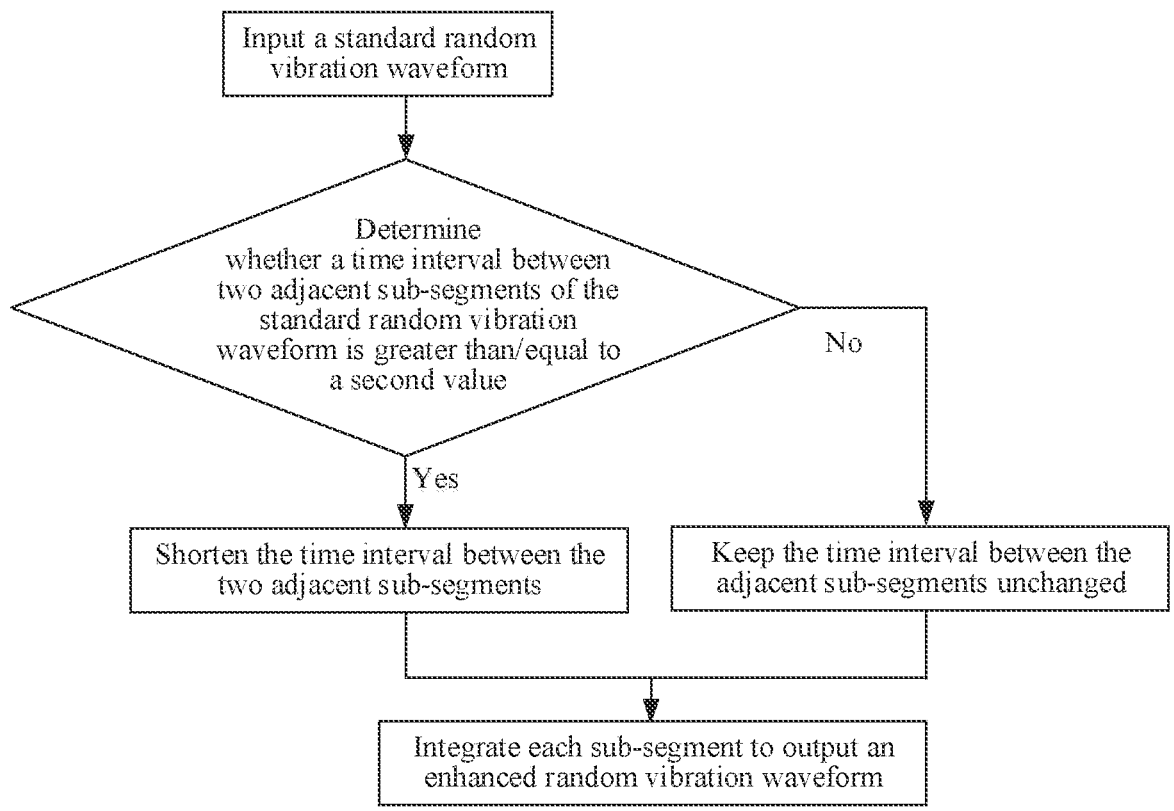
FIG. 10 is a schematic flowchart of a method for shortening a time interval between adjacent sub-segments according to an embodiment of this application.

FIG. 10 shows an example of a schematic flowchart of a method for shortening an interval between sub-segments.

As shown in FIG. 10, the electronic device may determine, based on the standard random vibration waveform shown in FIG. 7, whether a time interval between two adjacent sub-segments in the standard random vibration waveform is greater than or equal to a second value. For example, the second value is 3 seconds. When it is determined that a vibration time of a sub-segment is less than (or equal to) 3 seconds, the time interval is shortened by a specific value (for example, 1 second); and when it is determined that the time interval between the sub-segments is less than 3 seconds, the time interval between the adjacent sub-segments is kept unchanged. In addition, the vibration intensity of each sub-segment is consistent with the vibration intensity of the random vibration waveform, and the vibration frequency is also consistent. Finally, each sub-segment is integrated to obtain the enhanced random vibration waveform.

The method for shortening the time interval between the adjacent sub-segments includes: prolonging an end time of the former sub-segment or advancing a start time of the latter sub-segment, to shorten a time interval between adjacent sub-segments.

Figure 11:
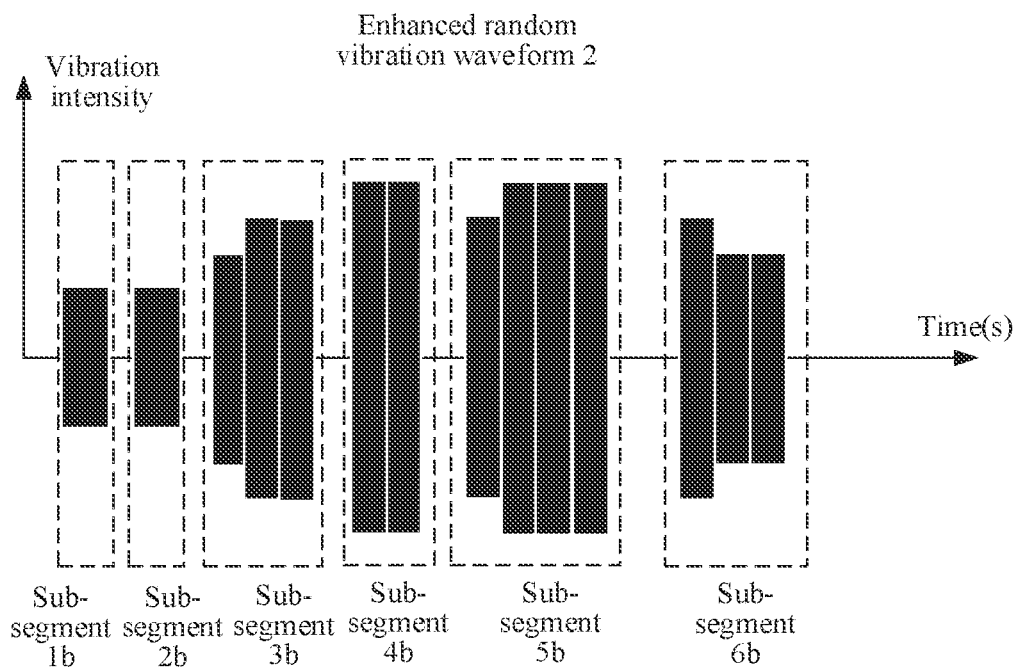
FIG. 11 is a schematic diagram of an enhanced random vibration waveform according to another embodiment of this application.

FIG. 11 shows an example of an enhanced random vibration waveform 1 outputted by using the enhanced random vibration information obtained in manner 2 and manner 3.

As shown in FIG. 11, the vibration intensity of each sub-segment in the enhanced vibration waveform 2 is consistent with the vibration intensity of the random vibration waveform, and the vibration frequency is also consistent.

In addition, the vibration time is uniformly increased for a short vibration whose duration of vibration in the random vibration waveform is less than or equal to a preset time (for example, 1 second). For example, in the standard random vibration waveform shown in FIG. 7, the duration of two vibrations corresponding to the sub-segment 1 and the sub-segment 2 is 1 second, which is a short vibration. Therefore, the corresponding sub-segment 1*b* and sub-segment 2*b* are obtained by prolonging the time of the sub-segment 1 and the sub-segment 2 by a value, for example, 0.5 seconds.

In addition, the end time of the former sub-segment in which the time interval between each sub-segment in the random vibration waveform is greater than or equal to a second value (for example, 3 seconds) is prolonged or the start time of the latter sub-segment is advanced. For example, the time interval between a sub-segment 3 and a sub-segment 4 in the standard random vibration waveform shown in FIG. 7 is 3 seconds. Therefore, an end time of the sub-segment 3 is prolonged to obtain a sub-segment 3*b*. For example, the time interval between a sub-segment 5 and a sub-segment 6 in the standard random vibration waveform shown in FIG. 7 is 3 seconds. Therefore, the end time of the sub-segment 5 is prolonged to obtain a sub-segment 5*b*.

Any of the foregoing manner 1 to manner 3 may be used in combination. For example, it not only enhances the vibration intensity but also increases the short vibration time; or it not only enhances the vibration intensity but also shortens the vibration interval; or it not only increases short vibration time but also shortens the vibration interval; or it not only enhances the vibration intensity, but also increases the short vibration time and shortens the vibration interval.

S403. The electronic device detects a specific event.

The specific event includes an incoming call, a message, a notification, an alarm clock, or a memo.

Specifically, the electronic device may detect an event such as a cellular incoming call or a network incoming call through a mobile communication module or a wireless communication module. Alternatively, the electronic device may detect the message through the mobile communication module. Alternatively, the electronic device may detect the notification through the wireless communication module. Alternatively, the electronic device may detect an event such as the alarm clock or the memo.

S404. The electronic device, in response to the detected specific event, drives a motor to vibrate based on corresponding enhanced random vibration information.

Specifically, after acquiring the enhanced random vibration information described in step S402, the electronic device 100 may control the motor to vibrate according to the start and end time of vibration, the vibration intensity, and the vibration frequency of each sub-segment in the enhanced random vibration information. Therefore, an effect brought by motor vibration and an effect of playing music when ringing have common rhythm and movement.

It should be noted that, before the electronic device 100 drives the motor to vibrate based on the enhanced random vibration information, the electronic device is required to enable an enhanced vibration function in advance. For example, the function may be enabled before any of the foregoing step S401 to step S403.

The enhanced vibration function may be enabled by default by the electronic device 100, or may be the enhanced vibration option 321B provided by the setting application shown in FIG. 3A to FIG. 3B in the UI embodiment above selected by the user, or may be the enhanced vibration option provided in the pull-down notification bar selected by the user, or may be that the electronic device 100 is triggered to enable the enhanced vibration function through the voice instruction.

After adopting the enhanced vibration prompting method provided in this application, the following effects may be implemented:

Effect 1: When the electronic device 100 detects an event such as an incoming call, a message, a notification, an alarm clock, or a memo event, if the electronic device 100 enables a music prompt and a vibration prompt in advance, that is, when enabling a ringing function and an enhanced vibration function, the electronic device 100 vibrates based on the feature of the music, and simultaneously brings an auditory and tactile prompt to the user, thereby increasing interest of the prompt.

Effect 2: If a volume/specification/performance of the motor arranged in the electronic device is normal, when the ringing music is not played, that is, when the user only enables the enhanced vibration prompt, and if the electronic device 100 is placed in a pocket, a table, or a backpack, although the music sense is weak in some periods of time in the ringing music, a vibration effect corresponding to a part with weak music sense is enhanced by increasing the vibration intensity, prolonging the time of short vibration or compressing the vibration interval. Thereby preventing the user from missing a call, or missing a message, a notification, an alarm clock, a memo event, or the like, and improve user experience.

Various implementations of this application may be arbitrarily combined to implement different technical effects.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive, or the like.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments may be performed. The storage medium includes: any medium that can store program code, such as a ROM, a RAM, a magnetic disk, or an optical disc.

In conclusion, what are described above are merely examples of embodiments of the technical solutions of the present invention, but is not intended to limit the protection scope of the present invention. Any modification, equivalent replacement, or improvement made without departing from the spirit and principle of the present invention shall fall within the protection scope of the present invention.

The invention claimed is:

1. An enhanced vibration prompting method, wherein the method is applicable to an electronic device, the method comprising:
    detecting a first event, wherein music corresponding to the first event comprises a first sub-segment and a second sub-segment; and
    vibrating at a first intensity during a first time period, and vibrating at a second intensity during a second time period, wherein the first time period, the first intensity, the second time period, and the second intensity conform to any one or more of the following:
        both the first intensity and the second intensity are greater than or equal to a third intensity, and the third intensity corresponds to a strongest music intensity in the first sub-segment and the second sub-segment;
        a length of the first time period is greater than a duration of the first sub-segment when the duration of the first sub-segment is less than or equal to a first value; or
        an interval between the first time period and the second time period is less than a time interval between the first sub-segment and the second sub-segment when the time interval between the first sub-segment and the second sub-segment is greater than or equal to a second value.

2. The method of claim 1, wherein before detecting, the first event, the method further comprises obtaining standard random vibration information based on the music, wherein the standard random vibration information comprises a third time period, a fourth intensity corresponding to the third time period, a fourth time period, and a fifth intensity corresponding to the fourth time period, wherein the third time period is equal to the duration of the first sub-segment, and the fourth time period is equal to a duration of the second sub-segment, wherein the fourth intensity corresponds to a sound intensity within the first sub-segment, and the fifth intensity corresponds to a sound intensity within the second sub-segment, and wherein the third intensity is greater than or equal to one of the fourth intensity and the fifth intensity.

3. The method of claim 1, wherein the first event comprises an incoming call, a message, a notification, an alarm clock, a memo event, game start, or video playing.

4. The method of claim 1, wherein the music corresponding to the first event is set by a user or set by default by the electronic device.

5. The method of claim 1, wherein the music corresponding to the first event is pre-stored in the electronic device, or obtained from another device by the electronic device.

6. The method of claim 1, wherein before vibrating at the first intensity during the first time period, and vibrating at the second intensity during the second time period, the method further comprises enabling an enhanced vibration function to vibrate the electronic device at the first intensity during the first time period and to vibrate the electronic device at the second intensity during the second time period.

7. The method of claim 6, wherein before enabling, the enhanced vibration function, the method further comprises receiving a first operation to trigger the electronic device to enable the enhanced vibration function.

8. The method of claim 7, wherein the first operation is acting on an enhanced vibration function option provided by a setting application, acting on an enhanced vibration function option provided by a pull-down notification bar, or a voice instruction provided by a user.

9. The method of claim 1, wherein before vibrating at the first intensity during the first time period, and vibrating at the second intensity during the second time period, the method further comprises receiving a second operation to set an enhancement level, wherein when the enhancement level is greater than a first threshold, the first time period, the first intensity, the second time period, and the second intensity conform to any one or more of the following:
    the third intensity is increased to be greater than a second threshold;
    the length of the first time period is increased to be greater than a third threshold; or
    the time interval is decreased to be shorter than a fourth threshold.

10. The method of claim 1, wherein the duration of the first sub-segment and a duration of the second sub-segment are obtained from a user or obtained by the electronic device according to an algorithm.

11. The method of claim 1, wherein the first sub-segment and the second sub-segment each comprise one or more of the following: a melody, a rhythm, or a beat of the music.

12. The method of claim 1, wherein the first intensity is the same as the second intensity.

13. The method of claim 1, further comprising driving a linear motor of the electronic device to vibrate at the first intensity during the first time period, and vibrate at the second intensity during the second time period.

14. The method of claim 1, further comprising playing the music while vibrating at the first intensity during the first time period, and vibrating at the second intensity during the second time period.

15. At least one chip comprising one or more processors configured to:
   detect a first event, wherein music corresponding to the first event comprises a first sub-segment and a second sub-segment; and
   cause a vibration at a first intensity during a first time period, and cause a vibration at a second intensity during a second time period, wherein the first time period, the first intensity, the second time period, and the second intensity conform to any one or more of the following:
      both the first intensity and the second intensity are greater than or equal to a third intensity, and the third intensity corresponds to a strongest music intensity in the first sub-segment and the second sub-segment;
      a length of the first time period is greater than a duration of the first sub-segment when the duration of the first sub-segment is less than or equal to a first value; or
      an interval between the first time period and the second time period is less than a time interval between the first sub-segment and the second sub-segment when the time interval between the first sub-segment and the second sub-segment is greater than or equal to a second value.

16. The chip of claim 15, wherein before detecting the first event, the electronic device is further configured to obtain standard random vibration information based on the music, wherein the standard random vibration information comprises a third time period, a fourth intensity corresponding to the third time period, a fourth time period, and a fifth intensity corresponding to the fourth time period, wherein the third time period is equal to the duration of the first sub-segment, and the fourth time period is equal to a duration of the second sub-segment, wherein the fourth intensity corresponds to a sound intensity within the first sub-segment, and the fifth intensity corresponds to a sound intensity within the second sub-segment, and wherein the third intensity is greater than or equal to one of the fourth intensity and the fifth intensity.

17. An electronic device, comprising:
   one or more processors; and
   one or more memories coupled to the one or more processors, the one or more memories being configured to store instructions that, when executed by the one or more processors, cause the electronic device to be configured to:
      detect a first event, wherein music corresponding to the first event comprises a first sub-segment and a second sub-segment; and
      vibrate at a first intensity during a first time period, and vibrate at a second intensity during a second time period, wherein the first time period, the first intensity, the second time period, and the second intensity conform to any one or more of the following:
         both the first intensity and the second intensity are greater than or equal to a third intensity, and the third intensity corresponds to a strongest music intensity in the first sub-segment and the second sub-segment;
         a length of the first time period is greater than a duration of the first sub-segment when the duration of the first sub-segment is less than or equal to a first value; or
         an interval between the first time period and the second time period is less than a time interval between the first sub-segment and the second sub-segment when the time interval between the first sub-segment and the second sub-segment is greater than or equal to a second value.

18. The electronic device of claim 17, wherein before detecting the first event, the electronic device is further configured to obtain standard random vibration information based on the music, wherein the standard random vibration information comprises a third time period, a fourth intensity corresponding to the third time period, a fourth time period, and a fifth intensity corresponding to the fourth time period, wherein the third time period is equal to the duration of the first sub-segment, and the fourth time period is equal to a duration of the second sub-segment, wherein the fourth intensity corresponds to a sound intensity within the first sub-segment, and the fifth intensity corresponds to a sound intensity within the second sub-segment, and wherein the third intensity is greater than or equal to one of the fourth intensity and the fifth intensity.

19. The electronic device of claim 17, further comprising a linear motor, wherein the instructions, when executed by the one or more processors, further cause the electronic device to be configured to drive the linear motor to vibrate at the first intensity during the first time period, and vibrate at the second intensity during the second time period.

20. The electronic device of claim 17, further comprising a speaker, wherein the instructions, when executed by the one or more processors, further cause the electronic device to be configured to play the music with the speaker, while vibrating at the first intensity during the first time period, and vibrating at the second intensity during the second time period.

* * * * *